Feb. 16, 1954  L. L. IRVIN ET AL  2,668,997
PARACHUTE EQUIPMENT
Filed Nov. 19, 1945  2 Sheets-Sheet 1
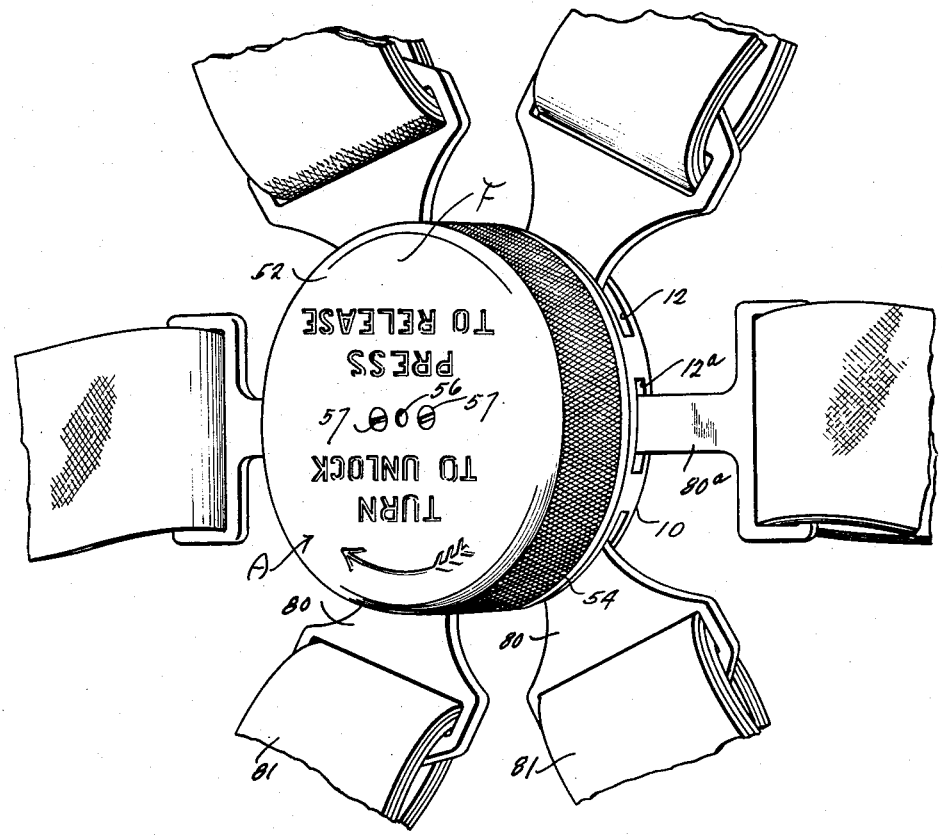
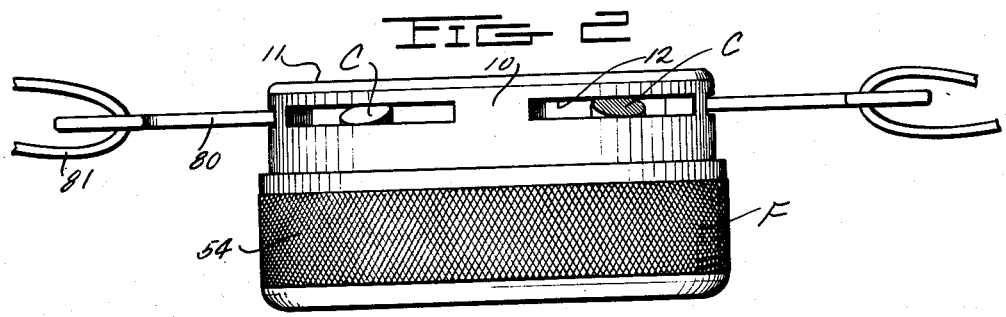
INVENTORS
Leslie L. Irvin
George H. Gould
BY Lancaster, Allwine Rommel
ATTORNEYS.

Feb. 16, 1954  L. L. IRVIN ET AL  2,668,997
PARACHUTE EQUIPMENT
Filed Nov. 19, 1945  2 Sheets-Sheet 2
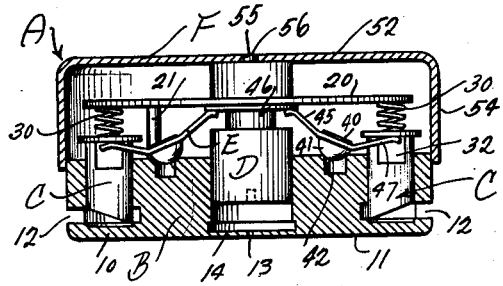
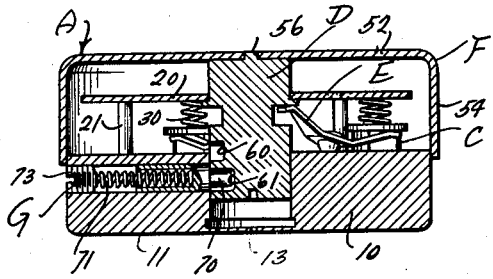
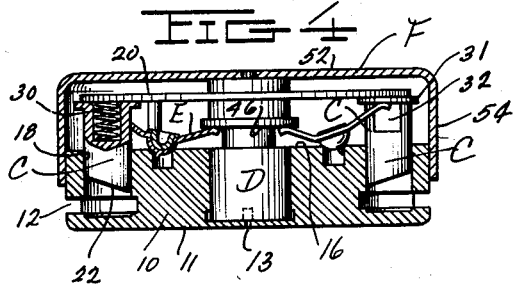
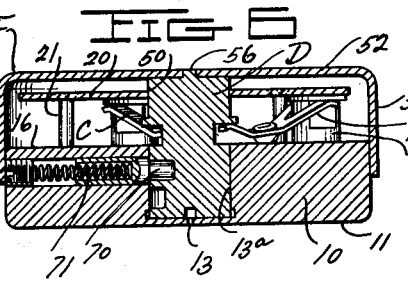
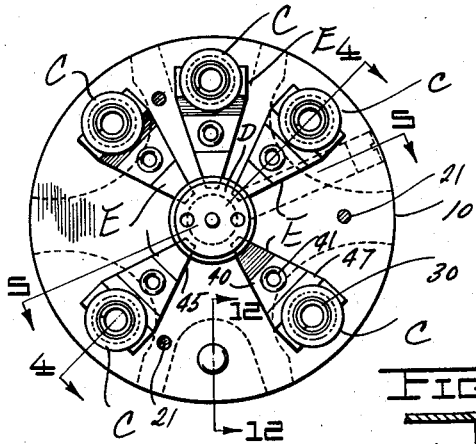
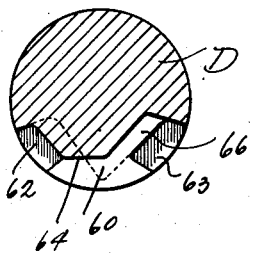
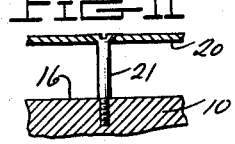
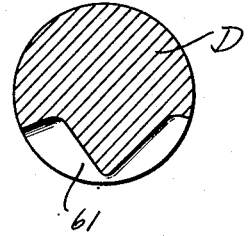
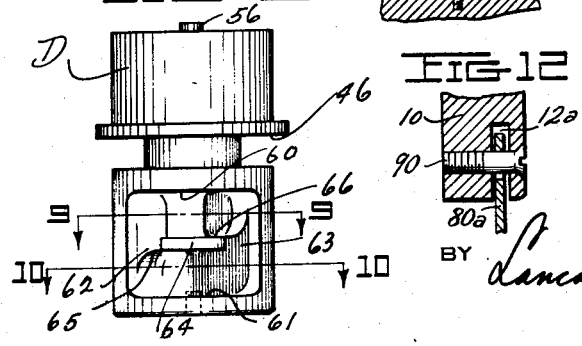
INVENTORS
Leslie L. Irvin
George H. Gould
BY
ATTORNEYS.

Patented Feb. 16, 1954

2,668,997

UNITED STATES PATENT OFFICE 2,668,997

PARACHUTE EQUIPMENT

Leslie L. Irvin, Letchworth, and George H. Gould, London, England, assignors to Irving Air Chute Company, Inc., Buffalo, N. Y., a corporation Application November 19, 1945, Serial No. 629,530
In Great Britain November 16, 1944

Section 1, Public Law 690, August 8, 1946
Patent expires November 16, 1964

5 Claims. (Cl. 24—205.17)

This invention relates to improvements in harness coupling structure particularly well adapted for use in connection with aircraft safety belts and parachute harnesses, but not limited thereto.

The primary object of this invention is the provision of a coupling device adapted to couple the fastener ends of straps or webbing of safety belts, harnesses and the like in such manner that the same is practically fool-proof in operation and can be actuated for release of the harness only upon manual intervention of an individual; the coupling device being of such nature as to rest comfortably upon the body of the wearer.

A further object of this invention is the provision of an improved quick release coupling device for parachute harnesses and the like adapted for the connection of six fastener parts of harness webbing thereto.

A further object of the invention is the provision of an improved coupling of the general nature described having means to prevent snow, ice, dirt and other debris from interfering with the successful actuation of the control parts.

A further object of this invention is the provision of an improved quick release coupling device for parachute harnesses, safety belts and the like which will fit comfortably upon the body of a wearer and which includes as a feature thereof a depressible reciprocatory rotary control member which is held against turning except thru manual intervention.

Other objects and advantages of the invention will be apparent from the following detailed description.

In the accompanying drawings, forming a part of this specification, and wherein similar reference characters designate corresponding parts throughout the several views—

Figure 1 is a perspective view showing the improved quick release coupling as attached to six fasteners for the straps or webbing of parachute harness or the like, showing the same in locked position.

Figure 2 is an edge view of the coupling, showing the manner in which the fastener securing ends of the detents are located closely to the body facing surface of the coupling.

Figure 3 is a cross sectional view showing the detents of the coupling in locking position.

Figure 4 is a cross sectional view of the parts similar to those shown in Figure 3, and taken on the line 4—4 of Figure 7 showing the detents out of locking position.

Figure 5 is a cross sectional view taken substantially on the line 5—5 of Figure 7.

Figure 6 is a view of the parts shown in Figure 5 with the control member depressed and in the position in which the parts would assume with the detents out of locking position.

Figure 7 is a plan view of the coupling with the hand engaging control member removed and an inner detent movement limiting member removed.

Figure 8 is a side elevation of a hub member associated with the coupling.

Figures 9 and 10 are cross sectional views taken substantially on their respective lines shown in Figure 8 of the drawings.

Figure 11 is a fragmentary view showing a positioning screw which holds the detent movement limiting member in definite relation to the supporting body of the coupling.

Figure 12 is a fragmentary cross sectional view taken substantially on the line 12—12 of Figure 7.

In the drawings, wherein for the purpose of illustration is shown only a preferred embodiment of the invention, the letter A may generally designate the improved coupling. It consists of a main body portion 10 having reciprocably mounted therein detents C controlled by a reciprocating hub member D as to their locking and unlocking positions, by means of individual levers E; a control member F being attached to the hub D. Locking means G is associated with the hub structure and control member for locking the position thereof.

So far as the prior art is concerned, acknowledgement is made of the fact that heretofore reciprocable and rotary control members have been provided for regulating the positions of the detents in their locked and unlocked positions, but the association has been such that the fasteners have been attached on the coupling towards the outer face thereof and this forces the coupling uncomfortably against the body of the wearer. Aviators who are compelled to wear a coupling of this sort for many hours with the harness straps or any of them in taut position have found the discomfort such that very often the aviator will open the harness to secure relief. On the other hand, couplings have been made which eliminate to some extent such discomfort by providing pivoted manual control members for actuating the detents. In the main these have been unsatisfactory.

Referring to the body 10, which is of course the supporting structure for the other details, the same includes a shallow cylindrical structure having a flat outer face 11 which is adapted to be positioned adjacent to the body of the wearer. The same is provided with six lateral slots 12. Centrally, the body 10 is provided with a socket 13a for reciprocably and rotatably receiving the hub D which is closed at the face 11 by a thin wall structure 14 having a lubricant receiving aperture 13. The body 10 upon its face 16 opposite the face 11 is provided with passageways 18 reciprocably receiving the detents C; these passageways opening in the respective slots 12.

A disc-like member 20 is connected by screws 21 upon the body 10 in facing relation with the surface 16 and spaced therefrom a definite distance by the screws 21, which have reduced screw threaded shanks as shown in Figure 11 of the drawings.

The detents C are provided with sloping faces 22 facing in the direction of the outlets of the slots 12 for a purpose well understood in the art. These detents C are socketed inwardly from their outer ends for receiving compressed individual springs 30 which abut the under surface of the disc 20 and normally urge the detents towards and across the respective slots 12. These detents, in the space between the face 16 of the body and the disc 20, are annularly flanged at 31, and each detent C is provided with diametrically opposed reduced flat surfaces 32 adapted to receive the bifurcated ends of the levers E in such manner as to prevent turning of the respective detents, so that their sloping faces 22 will always face the outlet of the slot 12 when extended thereacross.

It will be noted from the drawings that the detents C move from a locked position in a direction away from the body of the wearer, to an unlocked position. This is in contradistinction to couplings of this sort heretofore provided, which operate the exact reverse, and of course said prior couplings operating on such a principle provide a very bulky portion of the coupling which presses with discomfort against the body of the wearer. In the present coupling, to actuate the detents, in such relation, by means of a rotatable and depressible control arrangement, we prefer to provide the individual levers E operating the detents directly through the hub D. These levers E include an intermediate portion 40 provided with a pointed ball 41 operating each within a socket 42 inwardly from the face 16 of the body 10. In angled relation therewith the inner ends of each of said levers or members E are provided with a taper 45 extending into an annular groove 46 provided in the hub D. Their outer ends are likewise angled and bifurcated at 47; the fingers forming the bifurcations engaging in close spaced relation the flat surfaces 32 of the detents C beneath the flanges 31 of the detents.

In general it should be noted that when the hub D is outermost in its socket within the body 10, as shown in Figures 3 and 5, the levers E are in position so that the individual springs of the detents will force the latter into locking position across the respective slots 12. Depression of the hub D from this position, as shown in Figures 4 and 6, and as will be described in detail, locks the individual levers E and moves the detents C out of the slots 12 and compresses the individual springs 30 to the position shown.

The hub structure D is of course not directly grasped by the wearer of the coupling, but it is controlled as to depression and rotation through the operator's grasp of the control member F. To that end disc 20 above described is centrally apertured at 50 through which the outer end of the hub D extends in either of its positions. The control member F is of a cup-shaped formation, of rather thin gauged metal or other material, including an outer wall 52 and a protecting skirt or wall 54 of cylindrical formation extending normal to the wall 52. The wall 52 has a central opening 55 for receiving a small centering boss 56 upon the outer end of the hub D, and furthermore the wall 52 is provided with openings at each side of the opening 55 for receiving screws 57 by means of which to attach the hub D to the control member F against relative movement of these two parts.

It will be noted that the skirt 54 is of such length as to cover the space between the inside of the wall 52 and the top surface 16 of the body 10, at all times. The inner surface of the skirt 54 may be very closely spaced from the outer peripheral edges of the body 10 or even in sliding contact therewith, altho it is preferred that the spacing surfaces be such that they will not bind; the purpose being to exclude snow, ice, dirt and other debris so that the control arrangement may be rotated and depressed with respect to the body 10 to insure the safety operation of the coupling at all times and under all circumstances. This has heretofore been the defect of present types of coupling structures in general use for parachute and safety belt equipment.

The locking arrangement for holding the hub structure and the control member in position against movement towards or away from the body 10, except through manual intervention upon the part of the operator, consists in the provision, inwardly from the outer peripheral surface of the hub D, of outer and inner grooves 60 and 61 extending for an arc of preferably less than 180° each, and located in parallelism. These are connected at their ends by groove-like passageways 62 and 63; the separating portions 64 between said grooves providing a locking shoulder 65 facing the groove 61 at one end thereof, and a locking shoulder 66 facing the groove 60 at the opposite end thereof. These grooves, of course, have cam-like faces and against these cam-like faces a locking pin 70 is urged by a spring 71. A cap screw or nut 73 holds the spring in compression and normally urges the lock pin 70 into one or the other grooves in the relation shown in Figure 5 of the drawings. With the locking pin in the left side of the groove 61 facing the locking shoulder 65, the detents C will lie in locking position as shown in Figure 3. If it is now necessary to remove the detents to an unlocked position, it is necessary for the operator to grasp the control member F and rotate it through the desired arc until the locking pin 70 is opposite the passageway 63. This movement is, of course, resisted by reason of the cam-like surfaces facing the locking grooves 61 and this resistance compels the operator to turn the control member with some effort to place the locking pin opposite the passageway 63. The operator then depresses the control member in the direction of the base 10 and the pin 70 will then snap into the deeper end of the groove 60 and face the locking shoulder 66, and at which position the control member will be locked in the position shown in Figures 4 and 6, and of course the detents will be raised through depression of the control arrangement for release of the fasteners upon the straps of the harness or belt. To again place the coupling in position so that the detents will snap to locking position, it is merely necessary for the operator to turn the control arrangement thru the desired arc and when the locking pin is opposite the passageway 62 the springs of the detents will force the hub D and its connected control member F to the position shown in Figure 3 and of course the detents will move to a locking position across the slots 12. In this position it will be noted that in order to attach the fasteners 80 with any of the harness or belt straps 81, it is merely necessary to insert the same to the point that the openings therein will lie across the detents and the latter will snap into the openings of these fasteners in accordance with practice well known in the art.

In the case of a parachute harness it is always desirable to have at least one web or strap of the harness secured to the coupling when the other webs or straps are released from the coupling, so as to prevent loss of the latter. To that end the body portion 10 across one of the slots 12ª may have a detachable bolt 90 secured through an aperture of one of the fasteners 80ª. While the fastener 80ª is detachable from the coupling, it is held in position at all times upon the harness during normal locked and unlocked operation of the other detents.

Various changes in the shape, size and arrangement of parts may be made to the form of invention herein shown and described, without departing from the spirit of the invention or the scope of the following claims.

We claim:

1. In a single point release coupling for parachute harnesses and the like the combination of a cylindrical-shaped shallow body having an arrangement of lateral slots therein, a plurality of detents reciprocably mounted in said body for movement across and away from the slots, spring means normally urging said detents across said slots into locking position, a rotatable and axially reciprocatory hub mounted upon said body, locking means for holding the hub against reciprocation until it is turned thru a predetermined arc, means connected with the hub for moving said detents against their spring action out of locking position with respect to said slots when the hub is linearly moved to an extended position upon the body, and a cup-like control member connected with said hub for movement therewith and relatively immovable with respect thereto including a skirt portion overlapping in close operating relation with the facing surface of the periphery of said body in any position of the hub upon said body, said skirt being of such length as not to cover said slots when the hub is depressed upon the body with the detents in locking position.

2. In a strap coupling device for harnesses the combination of a shallow body having laterally opening slots paralleling and lying close to that surface of the body adapted to contact a wearer, a plurality of detents slidably mounted in said body for lineal movement transverse to the body and across said slots, spring means normally urging the detents into locking positions across said slots, a rotatable hub mounted upon said body for axial reciprocatory movement thereon, means to hold the hub against reciprocation until it is turned into a definite position, means connected to the hub for withdrawing the detents from locking positions with respect to their respective slots upon depression of the hub upon said body, and a cup-shaped hand grasping control member including a wall portion secured to the hub for controlling the latter and a skirt portion disposed slidable over the periphery of the said body in any position of said cup-shaped control member upon said body, said skirt portion only being of such length as not to cover the slots when the hub is depressed upon the body with the detents in locking position.

3. In a coupling device for releasably retaining fastener parts of a harness in a connected relation the combination of a shallow supporting body having a series of transverse slots opening laterally thereupon, a series of detents slidably mounted in the body for lineal movement in parallelism with each other, each detent being movable transversely across a slot of said series to releasably hold a harness fastener part when said part is disposed within the slot, spring means normally urging said detents into harness fastener part retaining position across said slots, a centrally arranged control hub rotatably and also reciprocably mounted for lineal movement in the body in parallelism to the movement of the detents, a pivoted member in the body for each detent, each pivoted member being positioned upon the body at a location between the central control hub and the respective detent with a pivot axis on the body intermediate the ends thereof, and each pivoted member having an inner arm portion operatively engaging the control hub at one side of its pivot axis, so as to permit relative rotation of said control hub independent of movement of the respected pivoted member, and an outer arm member at the opposite side of its pivot axis operatively connected to its respective detent whereby upon reciprocation of the central control hub the detents will be moved into and out of harness fastener retaining relation across said slots, and means upon said supporting body and control member to prevent lineal reciprocation of said control member until rotatably moved to a predetermined position.

4. A coupling as described in claim 3, wherein the central control hub is provided with an annular groove into which the inner arm portions of the pivoted members extend for the said operative connection of them with the central control hub whereby the hub can be rotated independent of the pivoted members.

5. In a coupling device for releasably retaining fastener parts of a harness in a connected relation, the combination of a shallow supporting body having an outer surface and an inner surface, said shallow supporting body immediately adjacent to the inner surface having a series of transverse slots opening laterally thereupon, a series of detents slidably mounted in the body for lineal movement in parallelism with each other, each detent being movable transversely across a slot of said series to releasably hold a harness fastener part when it is disposed within the slot, spring means urging said detents into harness fastener part retaining position across said slots, a centrally arranged control hub rotatably and also reciprocably mounted in the body for lineal movement in parallelism to the movement of the detents, said hub having a portion projecting from the outer surface of the body for controlling the movements of said hub, a pivoted member in the body for each detent, each pivoted member being positioned upon the body at a position between the central control hub and the respective detent with its pivot engaging said body intermediate the ends of the pivoted member, each pivoted member having an inner arm portion operatively engaging the control hub at one side of the pivot axis of the member, so as to permit relative rotation of said control hub independent of movement of the respective pivoted member and an outer arm portion at the opposite side of said pivot axis operatively connected to the respective detent, so that upon lineal movement of the central control hub the detents will be moved in parallelism therewith but in direction opposite to the movement of the control hub, into and out of harness fastener retainer relation across said slots, and means upon said supporting body and control member to prevent lineal reciprocation of said control member until rotatably moved into a predetermined position.

LESLIE L. IRVIN.
GEORGE H. GOULD.

References Cited in the file of this patent

UNITED STATES PATENTS

| Number | Name | Date |
|---|---|---|
| 1,842,611 | Irvin | Jan. 26, 1932 |
| 2,171,496 | Waite et al. | Aug. 29, 1939 |
| 2,255,258 | Leathern et al. | Sept. 9, 1941 |

FOREIGN PATENTS

| Number | Country | Date |
|---|---|---|
| 655,251 | France | of 1929 |
| 664,104 | France | of 1929 |
| 339,388 | Great Britain | Dec. 11, 1930 |
| 363,965 | Great Britain | of 1931 |
| 768,629 | France | of 1934 |
| 811,150 | France | Jan. 14, 1937 |